United States Patent

Valet et al.

[11] Patent Number: 5,369,140
[45] Date of Patent: Nov. 29, 1994

[54] RADIATION CURABLE LIGHT-STABLISED COMPOSITIONS

[75] Inventors: Andreas Valet, Eimeldingen; Manfred Köhler, Freiburg, both of Germany

[73] Assignee: Ciba-Geigy Corporation, Ardsley, N.Y.

[21] Appl. No.: 695,374

[22] Filed: May 3, 1991

[30] Foreign Application Priority Data

May 10, 1990 [CH] Switzerland .......... 1588/90

[51] Int. Cl.[5] .......... C08K 5/29; C08F 2/50; C08F 2/48
[52] U.S. Cl. .......... 522/75; 522/96; 522/174; 522/182; 524/89; 524/100
[58] Field of Search .......... 522/75, 96, 174, 182; 524/89, 100

[56] References Cited

U.S. PATENT DOCUMENTS

| | | | |
|---|---|---|---|
| 3,118,887 | 1/1964 | Hardy et al. | 524/929 |
| 3,242,175 | 3/1966 | Duennenberger et al. | 524/100 |
| 3,639,321 | 2/1972 | Fuhr et al. | 260/28.5 |
| 3,957,512 | 5/1976 | Kleeberg et al. | 260/468 J |
| 4,279,720 | 7/1981 | Berner | 260/45.9 R |
| 4,481,315 | 11/1984 | Rody et al. | 524/89 |
| 4,601,972 | 7/1986 | Small, Jr. | 522/75 |
| 4,619,956 | 10/1986 | Susi | 524/89 |
| 4,619,956 | 10/1986 | Susi | 524/87 |
| 4,740,542 | 4/1988 | Susi | 524/89 |
| 4,826,978 | 5/1989 | Migdal et al. | 544/216 |
| 4,833,038 | 5/1989 | Poole et al. | 522/113 |
| 4,962,142 | 10/1990 | Migdal et al. | 524/100 |
| 5,021,478 | 6/1991 | Ravichandran et al. | 524/100 |
| 5,064,883 | 11/1991 | Behrens et al. | 524/100 |

FOREIGN PATENT DOCUMENTS 0458741 11/1991 European Pat. Off.

Primary Examiner—Susan W. Berman
Attorney, Agent, or Firm—Luther A. R. Hall

[57] ABSTRACT

A radiation curable composition contains as light stabiliser a UV absorber of formula I

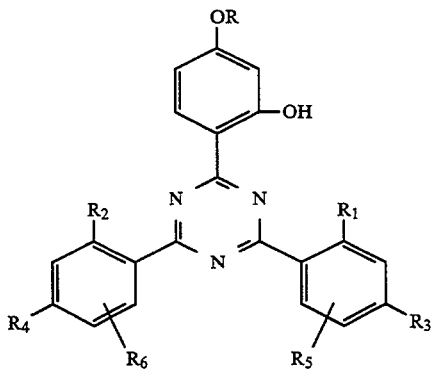

wherein R is hydrogen or $C_1$–$C_{18}$alkyl, $R_1$ and $R_2$ are each independently of the other H, OH, $C_1$–$C_{12}$alkyl, halogen or halomethyl, $R_3$ and $R_4$ are each independently of the other H, OH, $C_1$–$C_{12}$alkyl, $C_1$–$C_{18}$alkoxy or halogen, and $R_5$ and $R_6$ are each independently of the other H, $C_1$–$C_{12}$alkyl or halogen. These UV absorbers are substantially non-yellowing.

17 Claims, No Drawings

RADIATION CURABLE LIGHT-STABLISED COMPOSITIONS

The present invention relates to a radiation curable, light-stabilised composition based on an ethylenically unsaturated binder and at least one UV absorber of the 2-hydroxyphenyl-s-triazine type. The invention further relates to the use of the composition as topcoat and to a process for the radiation curing of said composition.

It is known that UV absorbers slow down the photopolymerisation of ethylenically unsaturated compounds. If, as is customary, a photoinitiator is used, then the wavelength of the UV absorption of the photoinitiator and of the UV absorber is a factor to be taken into account. Thus in DE-A-1 694 253 the proposal has been made to use benzoin ethers of secondary alcohols as photoinitiators, which ethers can be readily combined with minor amounts of UV absorbers whose absorption maxima are in the range 315–320 nm. The UV absorbers proposed in this publication are derivatives of 2-hydroxybenzophenone, of α-cyanoacrylic acid and of 2-hydroxyphenylbenzotriazole. The use of UV absorbers of the oxanilide type has been proposed in U.S. Pat. No. 4,833,038 for radiation curable acrylate resins.

The proposal has also been made to use light stabilisers of the class of the polyalkylpiperidines in place of UV absorbers, as it is known they do not absorb in the UV range. However, these amine light stabilisers tend to cause yellowing in the presence of carbonyl-type photoinitiators and can therefore only be used in conjunction with special initiators. Attention is drawn in this connection to EP-A-7059.

It has now been found that UV absorbers of the class of the 2-hydroxyphenyl-s-triazines are very suitable light stabilisers for radiation curable systems. They do not appreciably slow down the curing rate, especially in concentrations of up to 5 %. They cause no yellowing, or at least less than other UV absorbers and piperidine light stabilisers. Even when used in conjunction with sterically hindered amines, they cause less significant yellowing than other UV absorbers. Also in electron beam curing, in which normally no initiators are added, less yellowing occurs than with other light stabilisers.

Accordingly, the invention relates to a radiation curable, light-stabilised composition comprising
A) at least one ethylenically unsaturated binder, and
B) at least one UV absorber of formula I

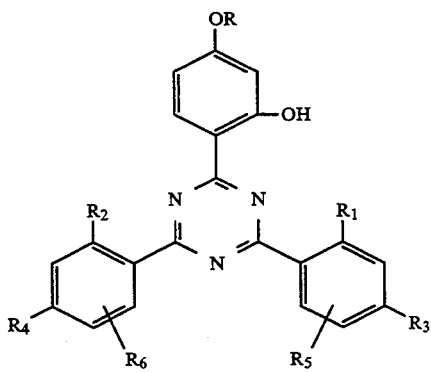

wherein R is hydrogen or $C_1-C_{18}$alkyl,
$R_1$ and $R_2$ are each independently of the other H, OH, $C_1-C_{12}$alkyl, halogen or halomethyl,
$R_3$ and $R_4$ are each independently of the other H, OH, $C_1-C_{12}$alkyl, $C_1-C_{18}$alkoxy or halogen, and $R_5$ and $R_6$ are each independently of the other H, $C_1-C_2$alkyl or halogen.

$R_1$, $R_2$, $R_3$, $R_4$, $R_5$ or $R_6$ as $C_1-C_{12}$alkyl may be linear or branched alkyl, typically methyl ethyl, n-propyl, isopropyl, n-butyl, isobutyl, sec-butyl, tert-butyl, n-amyl, n-hexyl, 2-ethylbutyl, n-octyl, 2-ethylhexyl, tert-butyl, isononyl, n-decyl, n-undecyl or n-dodecyl These substituents are preferably $C_1-C_{12}$alkyl, most preferably methyl.

R as $C_1-C_{18}$alkyl radical such as tetradecyl, hexadecyl or octadecyl. Preferably R is $C_1-C_{12}$alkyl.

$R_3$ and $R_4$ as $C_1-C_{18}$alkoxy are preferably $C_1-C_4$alkoxy, such as methoxy, ethoxy or butoxy. $R_1$ and $R_2$ as halomethyl are preferably trifluoromethyl. $R_1$ to $R_6$ as halogen are preferably chloro.

Preferred compositions contains a compound of formula I, wherein R is hydrogen or $C_1-C_{12}$alkyl, $R_1$ and $R_2$ are independently of the other H, OH, halogen or $C_1-C_4$alkyl, $R_3$ and $R_4$ are each independently of the other H, OH, $C_1-C_4$alkyl, $C_1-C_4$alkoxy or halogen, and $R_5$ and $R_6$ are each independently of the other H or $C_1-C_4$alkyl.

Particularly preferred compositions contain a compound of formula I, wherein R is hydrogen or $C_1-C_{12}$alkyl, $R_1$, $R_2$, $R_3$ and $R_4$ are each independently of one another H, $CH_3$ or Cl, and $R_5$ and $R_6$ are hydrogen.

The compounds have long been known as UV absorbers and have been proposed as light stabilisers for polymeric materials, for example in U.S. Pat. No. 3,118,887. The use thereof in films, coating compositions and moulding compositions in conjunction with sterically hindered amines is disclosed in U.S. Pat. No. 4,619, 956.

The ethylenically unsaturated binder is a binder conventionally used in radiation polymerisation. It contains at least one, preferably a plurality of, unsaturated compounds. The unsaturated compounds may contain one or more olefinic double bonds. They may be low molecular weight compounds (monomeric) or high molecular weight compounds (oligomeric). Illustrative examples of monomers containing one double bond are alkyl(-meth)acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate. Further examples are acrylonitrile, acrylamide, methacrylamide, N-substituted (meth)acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, propylene glycol, neopentyl glycol, hexamethylene glycol, or bisphenol A; 4,4′-bis(2-acryloyloxyethoxy)diphenylpropane, trimethylolpropane triacrylate, pentaerythritol triacrylate or tetraacrylate, vinyl acrylate, divinyl benzene, divinyl succinate, diallyl phthalate, triallylphosphate, triallylisocyanurate or tris(2-acryloyloxyethyl)isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are are unsaturated polyester resins which are normally prepared from maleic acid, phthalic acid and one or more diols and which have molecular weights of ca. 500 to 3000. Such unsaturated oligomers may also be referred to as prepolymers. Such two- and three-component systems based on a prepolymer are used for printing inks as well as for coating compositions, photoresists or other photocurable materials. Single component systems based on photocurable prepolymers are also often used as binders for printing inks.

Unsaturated polyester resins are normally used in two-component systems together with a mono-unsaturated monomer, preferably with styrene. Specific single component systems are often used for photoresists, for example the polymaleimides, polychalcones or polyimides disclosed in DE-OS 2 308 830.

The unsaturated compounds can also be used in admixture with non-photopolymerisable film-forming components. These components may typically be physically drying polymers or their solutions in organic solvents, such as nitrocellulose or cellulose acetobutyrate. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a a thermal aftertreatment in a second step.

The compositions of this invention preferably contain 0.01 to 5% by weight, most preferably 0.1 to 2% by weight, based on the binder, of the UV absorber of formula I.

If the compositions are to be cured with shortwave light, it will be expedient to add at least one photoinitiator. A wide range of different photoinitiators is at present available for radically curable systems. They include benzophenone and benzophenone derivatives, benzoin ethers, benzil ketals, dialkoxyacetophenones, α-hydroxyacetophenones, α-aminoacetophenones, α-haloacetophenones or aroylphosphine oxides. They differ in that they have different absorption maxima. To cover a wide absorption range it is possible to use a mixture of two or more photoinitiators.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the specral sensitivity. These photosensitisers are preferably aromatic carbonyl compounds such as thioxanthone, anthraquinone and 3-acylcoumarin derivatives as well as 3-(aroylmethylene)-thiazolines. Suitable light sources for shortwave light are typically mercury medium-pressure, high-pressure and low-pressure lamps, superactinic fluorescent tubes, metal halide lamps or lasers, the maximum emissions of which are in the range from 250 to 450 nm.

The photoinitiator or mixture of photoinitiators is preferably used in an amount of 0.1 to 10% by weight, most preferably 0.5 to 5% by weight, based on the binder.

If the compositions are to be cured by electron beams, no initiators or accelerators are necessary. A range of exposure systems is available for this purpose which operate at a voltage of ca. 100–400 kV and a current strength of 10–100 mA.

In addition to the UV absorbers of formula I, it is also possible to add light stabilisers of the class of sterically hindered amines, especially those of the class of the 2,2,6,6-tetramethylpiperidines. Such light stabilisers do not absorb in the UV range. A range of such light stabilisers is commercially available, for example bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate or the bis(1,2,2,6,6-pentamethyl-4-piperidyl) ester α-(3,5-di-tert-butyl-4-hydroxybenzyl)butylmalonic acid. Preferred groups and further examples of useful sterically hindered amines are listed in EP-A-356 677 on pages 3–25. This portion of the cited European patent application is incorporated herein as part of the disclosure.

For specific purposes it can be advantageous to add a mixture of two or more sterically hindered amines. The amount of sterically hindered amine or amine mixture is preferably 0.01 to 5% by weight, preferably 0.1 to 1% by weight, based on the binder.

Further substances which may be added to the radiation curable mixture are polymerisation inhibitors, fillers, pigments, solvents, antioxidants, phosphites, metal deactivators or levelling agents.

The radiation curable compositions of the invention can be used for different purposes. They are used first and foremost as topcoats. They may be pigmented or metallised, but they are preferably used as clear topcoats. Such compositions may be applied to various materials such as paper, wood, metal, plastics, glass or ceramic materials. The compositions of the invention are also of especial interest as clear top coats for multilayer coatings, as they protect the layers underneath against UV light.

Further fields of use are for making radiation curable photoresists and printed circuits as well as for image recording.

The radiation curable coating compositions can be applied to the substrates by conventional techniques such as brushing, spraying, dipping or coating. Multicoat application is also possible.

If a solvent is added for application it is conveniently allowed to evaporate before the cure. The cure is effected by irradiation with shortwave light or electron beams. The curing time is normally a few seconds, but may also be longer or shorter.

The invention is illustrated by the following non-limitative Examples in which parts and percentages are by weight.

The following UV absorbers are used in the Examples:

A) of the invention

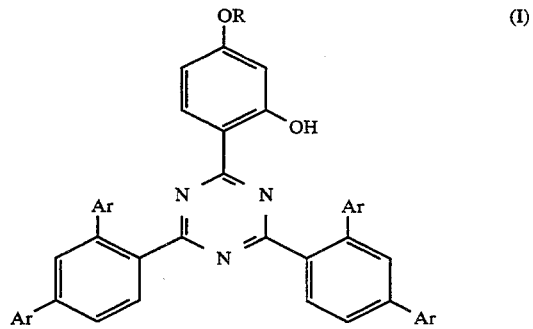

UV-1: R = H        Ar = CH$_3$
UV-2: R = C$_8$H$_{17}$   Ar = CH$_3$
UV-3: R = C$_3$H$_7$    Ar = H
UV-4: R = C$_8$H$_{17}$   Ar = H
UV-5: R = C$_{12}$H$_{25}$   Ar = H
UV-6: R = C$_{18}$H$_{37}$   Ar = H

B) Comparison compounds

V-1: 2-(2-hydroxy-3,5-di-tert-amylphenyl)benzotriazole

V-2:

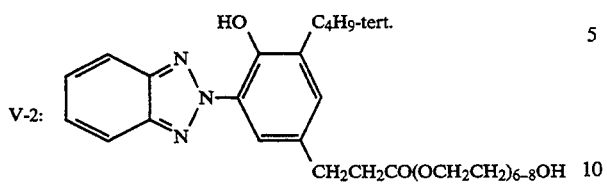

CH2CH2CO(OCH2CH2)6-8OH

V-3: 2,4-dihydroxybenzophenone
V-4: 2-hydroxy-4-dodecyloxybenzophenone
V-5: N-ethoxyphenyl-N'-(4-isododecylphenyl)oxalamide
V-6: 2-ethylhexyl-2-cyano-3,3-diphenylacrylate

EXAMPLE 1

Electron Beam Curing of a Clear Topcoat Composition

A clear topcoat composition is prepared from 70 parts of a tris(hydroxyethyl)isocyanurate acylate (Genomer ® T930, ex Mäder, CH) and 30 parts of 1,6-hexanediol diacrylate. To this composition is added 1 part of a UV absorber listed in Table 1. The samples are applied to aluminium sheets which have been primed with a white coil coat and are then irradiated in an electron beam exposure apparatus (ex Charmilles, Division Energy Sciences Internation, Geneva) at 3 Mrad. The resultant film thickness is ca. 40 μm.

The Yellowness Index (YI) according to ASTM D 1925 is measured 15 minutes after the cure. Higher YI values denote stonger yellowing. The values are reported in Table 1.

TABLE 1

| UV Absorber (1%) | YI |
| --- | --- |
| UV-2 | 8.6 |
| UV-3 | 6.1 |
| UV-4 | 5.5 |
| UV-5 | 5.9 |
| UV-6 | 6.8 |
| V-1 | 21.5 |
| V-2 | 17.5 |

It is evident that the addition of the UV absorber UV-1 of the invention effects only an insignificant increase in the YI, whereas both comparison samples (benzotriazole derivatives) effect a sharp rise in the YI.

EXAMPLE 2

UV Curing of a Clear Topcoat Composition

A clear topcoat composition is prepared from 70 parts of a tris(hydroxyethyl)isocyanurate acrylate (Genomer ® T930), 30 parts of 1,6-hexanediol diacrylate and 2 parts of 1-benzoylcyclohexanol as photoinitiator. To this composition is then added 1 part of a UV absorber of Table 2. The samples are applied to aluminium sheets which have been primed with a white coil coat and are then irradiated in a PPG UV exposure apparatus with two 80 W/cm lamps in two passes at a running speed of 10 m/min and thereby cured. The resultant layer thickness is ca. 40 μm.

The Yellowness Index (YI) according to ASTM D 1925 is measured after a storage time of 15 minutes. The results are reported in Table 2.

TABLE 2

| UV Absorber (1%) | YI |
| --- | --- |
| UV-1 | 6.3 |
| UV-2 | 3.8 |
| UV-3 | 2.7 |
| UV-5 | 2.8 |
| V-1 | 16.3 |
| V-2 | 12.5 |

As in Example 1, the UV absorbers of the invention also cause substantially less yellowing in UV curing.

EXAMPLE 3

Weathering Resistance of a Clear Topcoat Composition

The procedure of Example 2 is repeated, but with the addition of 1.5% (instead of 1%) of UV absorber. The weathering resistance of the cured topcoat compositions is tested in two different UV ranges:

A) by exposure to weathering in a Q-Panel QUV apparatus with UVA 340 lamps and at a cycle of 8 h UV irradiation at 70° C. and 4 h condensation at 50° C.
B) by exposure to weathering in a an Atlas UVCON apparatus with UVB 313 lamps at a cycle of 8 h UV irradiation at 70° C. and 4 h condensation at 50° C.

The Yellowness Index of the clear topcoat samples is measured after 200 h and 2000 h weathering. The results are reported in Tables 3 and 3a.

TABLE 3

| | UVA weathering | |
| --- | --- | --- |
| UV Absorber (1.5%) | YI after 200 h | YI after 2000 h |
| UV-1 | −0.2 | −0.5 |
| UV-2 | 0.7 | 2.3 |
| V-3 | 3.5 | 5.6 |
| V-5 | 2.6 | 8.0 |

TABLE 3a

| | UVB weathering | |
| --- | --- | --- |
| UV Absorber (1.5%) | YI after 200 h | YI after 2000 h |
| UV-1 | 0.7 | 0.7 |
| UV-2 | 1.1 | 3.0 |
| V-3 | 4.6 | 23.5 |
| V-5 | 4.5 | 23.7 |

EXAMPLE 4

Weathering Resistance of a 2 Layer Metallic Coating Composition

Aluminium sheets which have been primed with a white coil coat are coated with a silver metallic stoving lacquer based on polyester/cellulose acetobutyrate/melamine resin and cured at 120° C. The clear topcoat composition described in Example 1, to which 1% of UV absorber is added, is applied to this base coat. The samples are electron beam cured as described in Example 1. The cured samples are exposed to weathering in an Atlas UVCON apparatus with UVB 313 lamps at a cycle of 4 h UV irradiation at 60° C. and 4 h condensation at 50° C. The colour difference ΔE according to DIN 6174 as compared with the initial value is measured after 900 h. The results are reported in Table 4.

TABLE 4

| UV Absorber (1%) | ΔE after 900 h |
|---|---|
| UV-2 | 0.5 |
| UV-4 | 0.7 |
| V-3 | 1.9 |
| V-6 | 2.0 |

EXAMPLE 5

Weathering Resistance of a 2 Layer Metallic Coating Composition

The procedure of Example 4 is repeated, except that the topcoat composition is UV cured as described in Example 2.

The cured samples are exposed to weathering for 1600 h in an Atlas UVCON apparatus with UVB 313 lamps at a cycle of 4 h UV irradiation at 60° C. and 4 h condensation at 50° C. The Yellowness Index of the samples is measured before and after weathering. The difference between these two measurements (ΔYI) is shown in Table 5.

TABLE 5

| UV Absorber (1%) | ΔYI after 1600 h |
|---|---|
| UV-1 | 0.4 |
| UV-2 | 0.3 |
| UV-3 | 1.6 |
| UV-5 | 1.0 |
| V-1 | 3.1 |
| V-2 | 3.1 |
| V-4 | 3.1 |
| V-5 | 2.5 |

What is claimed is:

1. A radiation curable, light-stabilized coating composition comprising:
   (A) a curable ethylenically unsaturated monomer or oligomer which is crosslinkable upon exposure to radiation or electron beams and selected from the group consisting of:
   a) alkyl (meth)acrylates,
   b) hydroxyalkyl (meth)acrylates,
   c) acylamide,
   d) methacrylamide,
   e) N-substituted (meth)acylamides,
   f) vinyl esters,
   g) vinyl esters,
   h) styrene,
   i) alkylstyrenes,
   j) halostyrenes,
   k) N-vinylpyrrolidone,
   l) vinyl chloride,
   m) vinylidene chloride,
   n) 4,4'-bis(2-acryloyloxyethoxy)diphenylpropane,
   o) trimethylolpropane triacrylate,
   p) pentaerythritol triacrylate and tetraacrylate,
   q) vinyl acrylate,
   r) divinylbenzene,
   s) divinyl succinate,
   t) diallyl phthalate,
   u) triallyl phosphate,
   v) triallyl isocyanurate,
   w) tris(2-acryloyloxyethyl)isocyanurate,
   x) ethylene glycol diacrylate,
   y) bisphenol A diacrylate,
   z) acrylated epoxy resins,
   aa) acrylated polyethers,
   bb) acylated polyurethanes,
   cc) acylated polyesters,
   dd) unsaturated polyester resins prepared from maleic acid, phthalic acid and one or more diols which have molecular weights of ca. 500 to 3000; and
   ee) mixtures of said monomers and oligomers; and
   B) an effective stabilizing amount of triazine UV absorber of formula I

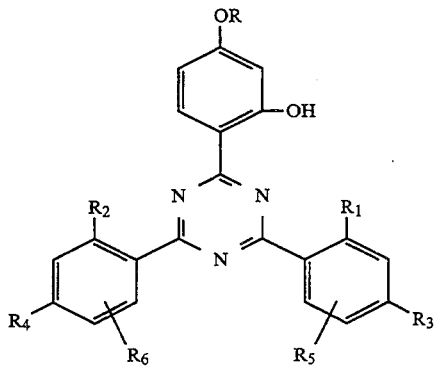

wherein
R is hydrogen or $C_1$-$C_{18}$alkyl,
$R_1$ and $R_2$ are each, independently of the other, hydrogen, OH, $C_1$-$C_{12}$ alkyl, halogen or halomethyl,
$R_3$ and $R_4$ are each, independently of the other, hydrogen, OH, $C_1$-$C_{12}$alkyl, $C_1$-$C_{18}$ alkoxy or halogen, and
$R_5$ and $R_6$ are each, independently of the other, hydrogen, $C_1$-$C_{12}$alkyl or halogen.

2. A radiation curable composition according to claim 1, wherein the binder contains a plurality of ethylenically unsaturated compounds.

3. A radiation curable composition according to claim 1 which contains a UV absorber of formula I, wherein R is hydrogen or $C_1$-$C_{12}$alkyl, $R_1$ and $R_2$ are each independently of the other H, OH, halogen or $C_1$-$C_4$alkyl, $R_3$ and $R_4$ are each independently of the other H, OH, $C_1$-$C_4$alkyl, $C_1$-$C_4$alkoxy or halogen, and $R_5$ and $R_6$ are each independently of the other H or $C_1$-$C_4$alkyl.

4. A radiation curable composition according to claim 1 which contains a UV absorber of formula I, wherein R is hydrogen or $C_1$-$C_{12}$alkyl, $R_1$, $R_2$, $R_3$ and $R_4$ are each independently of one another H, $CH_3$ or Cl, and $R_5$ and $R_6$ are hydrogen.

5. A radiation curable composition according to claim 1 which contains a UV absorber of formula I, wherein R is octyl $R_1$, $R_2$, $R_3$ and $R_4$ are methyl, and $R_5$ and $R_6$ are hydrogen.

6. A radiation curable composition according to claim 1 which contains 0.01 to 5% by weight, based on the binder, of a UV absorber of formula I.

7. A radiation curable composition according to claim 1, which additionally comprises C) at least one photoinitiator.

8. A radiation curable composition according to claim 1, which comprises 0.1 to 10% by weight, based on the binder, of a photoinitiator or mixture of photoinitiators.

9. A radiation curable composition according to claim 1, which additionally comprises D) at least one light stabiliser of the class of the sterically hindered amines.

10. A radiation curable composition according to claim 1, which additionally comprises D) at least one light stabiliser of the class of the 2,2,6,6-tetramethylpiperidines.

11. A radiation curable composition according to claim 1, which contains 0.01 to 5% by weight, based on the binder, of a light stabiliser of the class of the sterically hindered amines as component D).

12. A process for radiation curing a coating composition based on an ethylenically unsaturated binder, which comprises incorporating therein at least one UV absorber of formula I as claimed in claim 1, applying said composition to a substrate and irradiating the coated substrate with electron beams.

13. A topcoat cured by the process according to claim 12.

14. A coating cured by the process according to claim 12.

15. A process for radiation curing a coating composition based on an ethylenically unsaturated binder, which comprises adding thereto at least one UV absorber of formula I as claimed in claim 1 and a photoinitiator, applying said composition to a substrate and irradiating the coated substrated with UV light.

16. A topcoat cured by the process according to claim 15.

17. A coating cured by the process according to claim 15.

* * * * *